UNITED STATES PATENT OFFICE.

ISAAC BERNHARD, OF PARIS, FRANCE.

IMPROVEMENT IN COMPOUNDS FOR THE PREVENTION AND REMOVAL OF INCRUSTATION IN STEAM-BOILERS.

Specification forming part of Letters Patent No. 153,036, dated July 14, 1874; application filed December 24, 1873.

*To all whom it may concern:*

Be it known that I, ISAAC BERNHARD, of Paris, France, have invented an Improved Compound for the Prevention of Incrustations in Steam-Boilers, of which the following is a specification:

This invention has for its object the production of an anti-calcareous preparation, which, being dissolved in the water of steam-boilers, prevents the formation of solid deposits or incrustations on the metal thereof, or disintegrates those already formed.

To this end I dissolve in, say, twenty-five gallons of water two hundred pounds weight of glue, or other easily-soluble animal gelatine of like description, and mix therewith one hundred pounds of ox or other animal gall, to which is added, say, from one to two pounds of phenate of soda, (phenol.) The mixture thus formed is run off into molds, and, when solidified by cooling, is ready for use.

A certain quantity of this preparation, say, in ordinary cases, one ounce avoirdupois per horse-power of the boiler, being dissolved in the water of the latter every eight days, reduces to a pulverulent state, and maintains in suspension, the saline or calcareous matters which would otherwise be deposited as incrustations on the metal. Even incrustations already formed are disintegrated and detached by the action of the compound, so as to become easily removable as a pulverulent sediment on emptying the boiler.

The quantity of the anti-calcareous matter to be added to the boiler is, of course, variable, according to the nature of the feed-water; but, as above stated, one ounce per horse-power per week will generally be found sufficient.

In certain cases the above-indicated proportions of glue or analogous materials may, when necessary, be reduced to a certain extent; but, as a rule, these proportions will be found to give the best results in practice.

What I claim is—

A compound for preventing and removing incrustations in steam-boilers, consisting of the combination of animal gall with glue or other animal gelatine and phenol, in the proportions substantially as described.

ISAAC BERNHARD.

Witnesses:
  L. MAZAUR,
  F. D. THENEW.